Patented Apr. 1, 1930

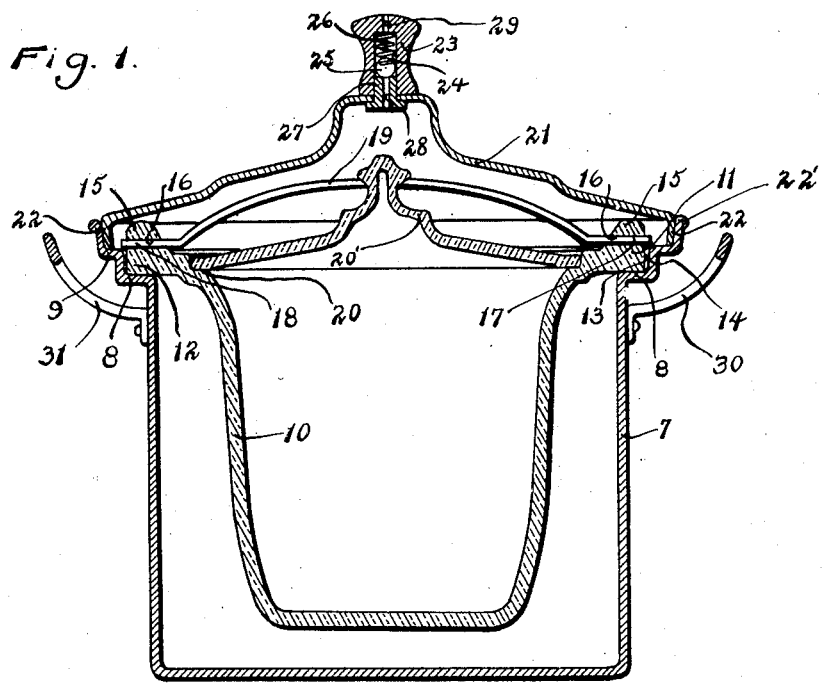
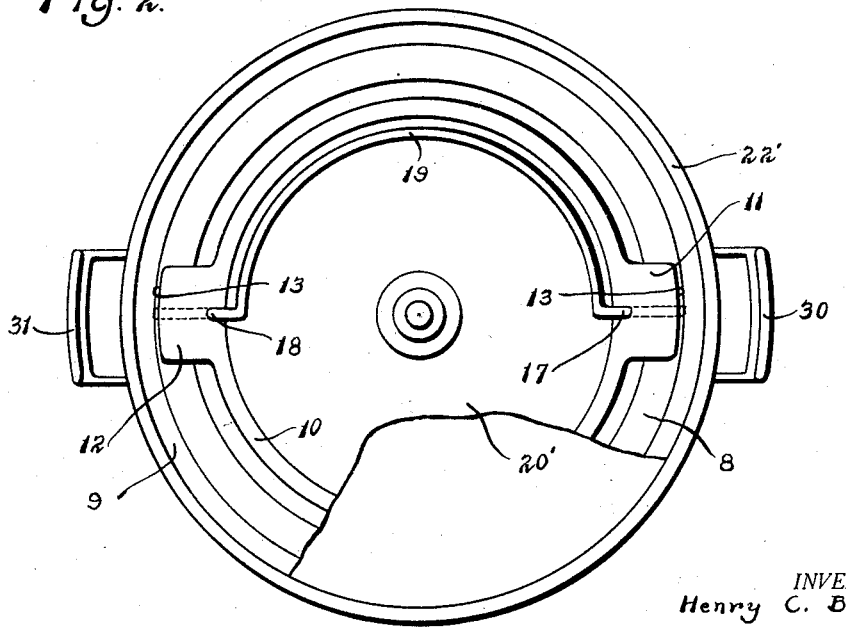

1,752,584

UNITED STATES PATENT OFFICE

HENRY C. BIETTE, OF DETROIT, MICHIGAN, ASSIGNOR OF TWENTY PER CENT TO JOHN S. LANGTIN, OF WYANDOTTE, MICHIGAN

STEAM COOKER

Application filed November 21, 1927. Serial No. 234,675.

My invention relates to a new and useful improvement in a steam cooker and has for its object the provision of a steam cooker which will be simple in structure, economical of manufacture, and highly efficient in use.

Another object of the invention is the provision of a steam cooker in which the food may be thoroughly cooked without stirring and without raising the steam to a high pressure.

Another object of the invention is the provision of a steam cooker of this class in which a pair of telescoping containers are used, the container for the food having a detachable handle mounted thereon so that when this container is removed from the outer container the handle may be removed therefrom and the container used as a serving dish.

Other objects will appear hereinafter.

The invention consists in the combination and arrangement of parts hereinafter described and claimed.

The invention will be best understood by a reference to the accompanying drawings which form a part of this specification, and in which, Fig. 1 is a central vertical sectional view of the invention.

Fig. 2 is a top plan view of the invention with the outer cover removed.

The outer container 7 is preferably made from metal such as aluminum and the like and is provided at its upper edge with a pair of superimposed, outwardly directed, shoulder-forming flanges 8 and 9. The inner container 10 is preferably formed from glass or similar material and is provided at diametrically opposite points with a pair of outwardly projecting lugs 11 and 12, the outer edges 13 of which are formed arcuate to conform to the cricle determined by the inner surface of the upwardly projecting portion 14 of the outer container 7. As shown in Fig. 1 each of these lugs is provided with an upwardly projecting portion 15 in which is formed the passage or opening 16 adapted for the reception of the angularly turned ends 17 and 18 of the bail 19 which is preferably formed from wire or other suitably resilient material.

The container 10 is provided with the shoulder 20 upon which engages the cover 20'. The bail 19 may be attached to the container 10 when removing the container 10 from the container 7 or when placing the same therein so that it is not necessary that the bail 19 become heated. However, if desired, the bail 19 may be left in position after the container 10 is placed in the container 7 as shown in Fig. 1. The removing of the bail 19 makes the container 10 a desirable dish from which the food may be served as it has no appearances which would not harmonize with a well appointed table.

A cover 21 is provided for the outer container 7 and is provided with the downwardly directed flange 22 adapted to engage at its lower edge the shoulder forming flange 9 and at its outer surface the upwardly projecting portion 22', the lugs 11 and 12 engaging the shoulder forming flange 8.

Mounted on the cover 21 is a suitable knob 23 having a recess 24 formed therein in which is positioned a ball 25 normally pressed by the spring 26 into engagement with the upper end of the connection 27 which serves to connect the knob 23 to the cover 21 and which is provided with the central passage 28 communicating with the recess 24, this recess also communicating with the passage 29 formed in the knob 23. The upwardly projecting portion 27 will be sufficiently resilient to engage the flange of the cover 21 to form a tight connection therewith so that a substantially steam tight connection of the cover 21 with the container 7 will be effected. Upon building up a slight pressure in the container 7 the ball 25 will be moved from its seat and the steam permitted to escape through the passage 29.

It is believed obvious that the container 7 will contain an amount of water and this water heated for steaming the contents of the container 10 and cooking the same.

Handles 30 and 31 are mounted on the container 7.

By forming the outer edges 13 of the lugs 12 and 11 to conform to the curvature as mentioned and by having the outer edges of these lugs spaced apart substantially the diametrical distance determined by the portion 14, a thrusting of the container 10 in the container 7 so as to cause the lugs 11 and 12 to bind, will be prevented and the container 10 may always be easily and quickly removed from the container 7.

While I have illustrated and described the preferred form of my invention, I do not wish to limit myself to the precise details of structure shown but desire to avail myself of such variations and modifications as come within the scope of the appended claim.

Having thus described my invention, what I claim as new and desire to secure by Letters Patent is:

A steam cooker of the class described, comprising: an outer container; a pair of outwardly projecting superimposed shoulder forming flanges on said container; an inner container adapted for positioning in said outer container; lugs on said inner container engaging the lowermost of said shoulder forming flanges and retaining said inner container in spaced relation to said outer container, the outer edges of said lugs being curved to conform to the curvature of said outer container surrounding the same; an upwardly projecting portion on the outer end of each of said lugs and provided with a passage extending therethrough; a bail; angularly turned ends on said bail, said ends being adapted for removably engaging in said passages.

In testimony whereof I have signed the foregoing specification.

HENRY C. BIETTE.